Figure 1:
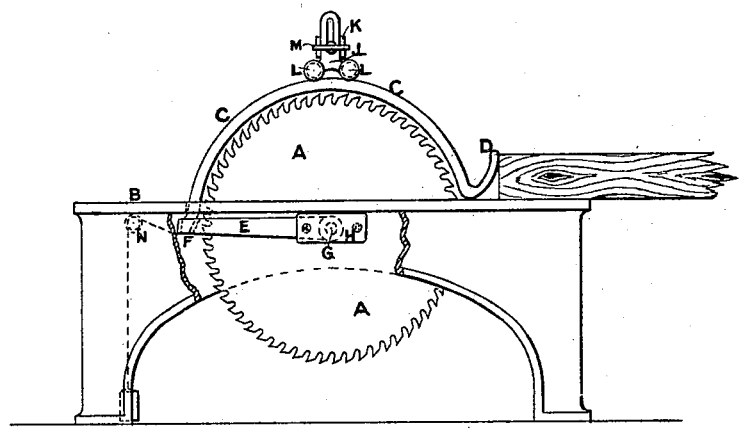

(No Model.) 2 Sheets—Sheet 1.

R. W. TAYLER.
GUARD FOR CIRCULAR SAWS.

No. 249,806. Patented Nov. 22, 1881.

Fig. 3ª.

Witnesses Inventor
Richard William Tayler
by John J. Halsted
his Atty.

(No Model.) 2 Sheets—Sheet 2.
R. W. TAYLER.
GUARD FOR CIRCULAR SAWS.
No. 249,806. Patented Nov. 22, 1881.
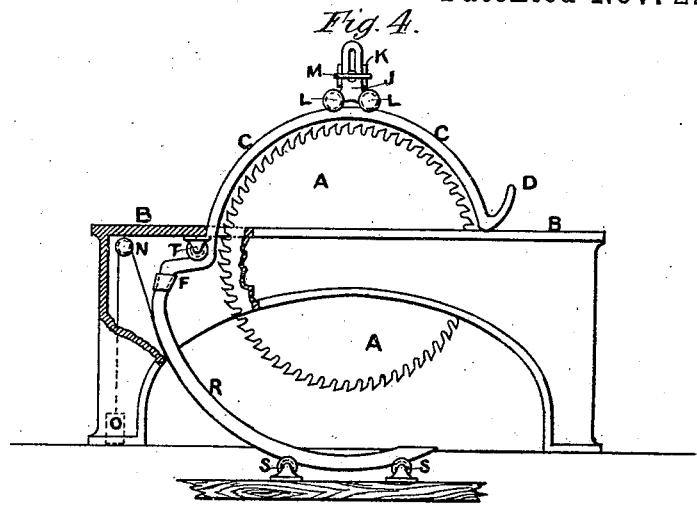
Fig. 4.
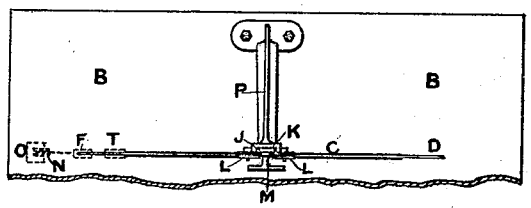
Fig. 5.
Fig. 7.
Fig. 6.
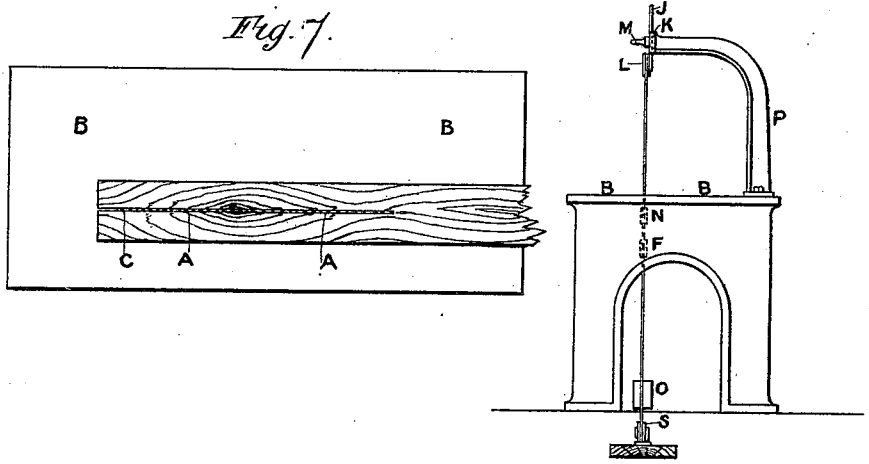
Witnesses.
Inventor.
Richard William Tayler
by
John J. Halsted
his Atty

UNITED STATES PATENT OFFICE.

RICHARD W. TAYLER, OF BURY ST. EDMUNDS, COUNTY OF SUFFOLK, ENGLAND.

GUARD FOR CIRCULAR SAWS.

SPECIFICATION forming part of Letters Patent No. 249,806, dated November 22, 1881.

Application filed April 5, 1881. (No model.) Patented in England March 18, 1880.

*To all whom it may concern:*

Be it known that I, RICHARD WILLIAM TAYLER, a subject of the Queen of Great Britain, residing at Bury St. Edmunds, in the county of Suffolk, England, have invented new and useful Improvements in Guards for Circular Saws, (for which I have obtained a patent in Great Britain, No. 1,156, bearing date 18th March, 1880, and sealed 10th September, 1880,) of which the following is a specification.

The dangers arising from the use of circular saws are twofold, namely: first, the worker's fingers, hands, or arms may come in contact with the front or descending side of the upper half of the saw; or, second, the same danger exists at the back side of the saw, and substances may be hurled forward by it with sufficient force to cause great injury to persons struck thereby.

My invention has for its object to obviate the dangers referred to; and it consists in applying to circular saws a self-acting safety shield, cover, or guard, constructed and arranged in the manner hereinafter described, whereby the descending or front part of the saw is automatically protected, so as to prevent objects coming into contact with this part of the saw until it becomes necessary to remove the said shield, cover, or guard, for the purpose of cutting substances with the saw, and the said shield, cover, or guard is extended or continued, so as to shield or cover the back or ascending part of the saw, so as to prevent anything coming into contact with it there.

My improved self-acting safety shield, cover, or guard is constructed of a plate or plates of suitable metal, such as iron or steel, of about the thickness of the saw, and the said shield, cover, or guard is curved to the radius of the saw, and is of any breadth required to give the proper rigidity. It is placed at a given distance from the teeth of the saw, and is provided with movable plates and adjustment slide and screw to suit the alterations in the radii of the saw by wear, or the substitution of smaller for larger saws, or substances deeper than the cutting part of the saw. The self-acting motion of the said shield, cover, or guard consists of a rotary sliding or lifting movement imparted to it by means of the substances to be cut by the saw coming into contact with a projection or lever fixed at the front, the same projection or lever holding the shield or cover in position while the substance is cut by the saw, and on being released by the substance when cut it is automatically brought to its normal position or starting-point by means of a spring or counter-weight.

The hereinbefore-described self-acting motion is effected by means of a slot in the plate of the shield, cover, or guard, which is caused to rotate, slide, or lift upon rollers, studs, or cams, the same being held in position by suitable plates, bolts, screws, and springs, and fixed or suspended to the saw-bench, as required, by a strong bracket or frame and the bolts and screws requisite for the purpose; but, to make my invention better understood, I will now proceed to describe the same by reference to the accompanying drawings, in which—

Figure 2:
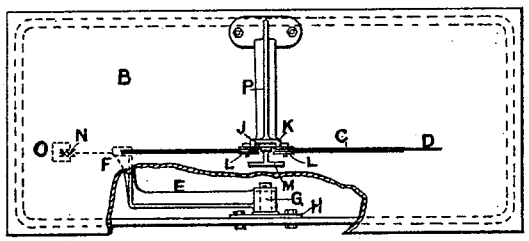
Figure 2:
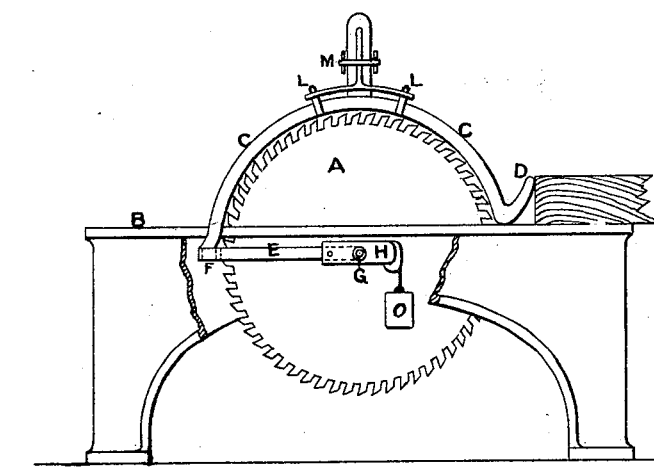
Figure 3:
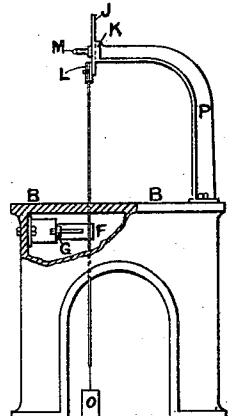

Figure 1, Sheet 1, represents, in elevation, a circular saw to which a shield, cover, or guard constructed according to my invention is applied. Fig. 2, Sheet 1, is a plan, and Fig. 3, Sheet 1, an end view, of the same; Fig. 3ª, Sheet 1, an elevation showing the weight at the front. Fig. 4, Sheet 2, represents, in elevation, the means of suspending the improved shield, cover, or guard over the saw by an attachment to the floor on which the bench rests. Fig. 5, Sheet 2, is a plan, and Fig. 6, Sheet 2, an end view, of the same. Fig. 7, Sheet 2, represents a piece of wood in the act of being cut, and passing, respectively, on either side of the shield, cover, or guard.

Similar letters in all the figures represent similar parts.

I will first describe my invention by reference to Figs. 1, 2, and 3.

A is the circular saw, and B is the bed of the said saw.

C is the self-acting safety shield, cover, or guard suspended over the saw A and in the same plane as the saw.

D is the projection or lever on the front of the guard or shield C, and the wood to be cut, coming first in contact with the said projection or lever D, raises the said guard or shield, thereby rendering it automatic.

E is an arm or lever, (shown more clearly in Fig. 2,) and F is the socket of the same, to receive the guard or shield and secure the same in suspension concentrically with the saw.

G is a stud or pin on which the said arm or lever can turn so as to keep the shield or guard concentric with the saw A in its movement. The said stud or pin is secured to the side of the bench by suitable means, such as a plate and bolts at H. (Better seen in Fig. 2.)

J is a metal claw, made to slide in the groove K, for the purpose of adjusting the rollers L to the shield C by the T-bolt M, to give the required steadiness to the said shield while the wood is being cut and passing between it.

N is a pulley, over which a wire or cord (shown in dotted lines) runs. This cord carries at its lower end the counter-weight O, the other end being connected to the shield C, for the purpose of bringing the shield back to its normal or starting point after the wood has been cut, in such a manner as to make the action automatic.

P is a bracket to which the claw J is fixed in the groove K, (seen also in Fig. 3,) and secured by bolts to the bed of the saw-bench.

Fig. 3ª, Sheet 1, is an elevation showing the weight O at the front instead of at the back, as hereinbefore described.

From this arrangement it will be seen, by reference to Figs. 1, 2, and 3, that the shield C will protect the teeth of the upper half of the circular saw, so as to prevent substances coming in contact with the front until the shield is first raised at the projection D; and it will also be seen that no substances can be caught up by the teeth of the ascending side of the saw and be thrown forward; but when a piece of wood is to be cut it is merely necessary to press it against the projection D, and the shield will be raised and the wood can be brought against the saw.

In Figs. 4, 5, and 6, Sheet 2, my invention is shown applied to a circular saw by attaching the shield or guard to a socket in a semi-circular guide-plate, R. The guide-rollers S support the weight, and are secured by the necessary bolts beneath the floor, and protected from dust by a cover. The said guide-rollers, together with the guide-pulley T and the rollers L in the claw J, keep it in a concentric position with the saw, and the counter-weight O, moving by means of the cord over the pulley N, make it self-acting, as in the arrangement hereinbefore described. V, Fig. 7, represents a piece of wood being cut by the saw and passing out at the back, after being cut, on either side of the shield, respectively.

Having now described the nature of my said invention and the best means with which I am acquainted for carrying the same into effect, I wish it to be understood that I do not limit myself to the precise details herein laid down and shown in the drawings, as the same may be varied without departing from the peculiar character of my invention; but

What I claim as my invention is—

The improvements in guards for circular saws hereinbefore described, consisting of a metal curved plate or plates suspended over the periphery or edge of the saw and in the same plane as the saw, but permitted to move in a circle concentric, or nearly concentric, with the saw, and mechanism, substantially as described, for restoring the same automatically to its normal position, the whole arranged substantially in the manner hereinbefore described.

R. W. TAYLER. [L. S.]

Witnesses:
DAVD. HEARN,
WR. AVIS.